A. J. A. BRUET.
AUXILIARY RAISING AND CENTERING VEHICLE RIM.
APPLICATION FILED DEC. 9, 1912.
1,078,825.
Patented Nov. 18, 1913.
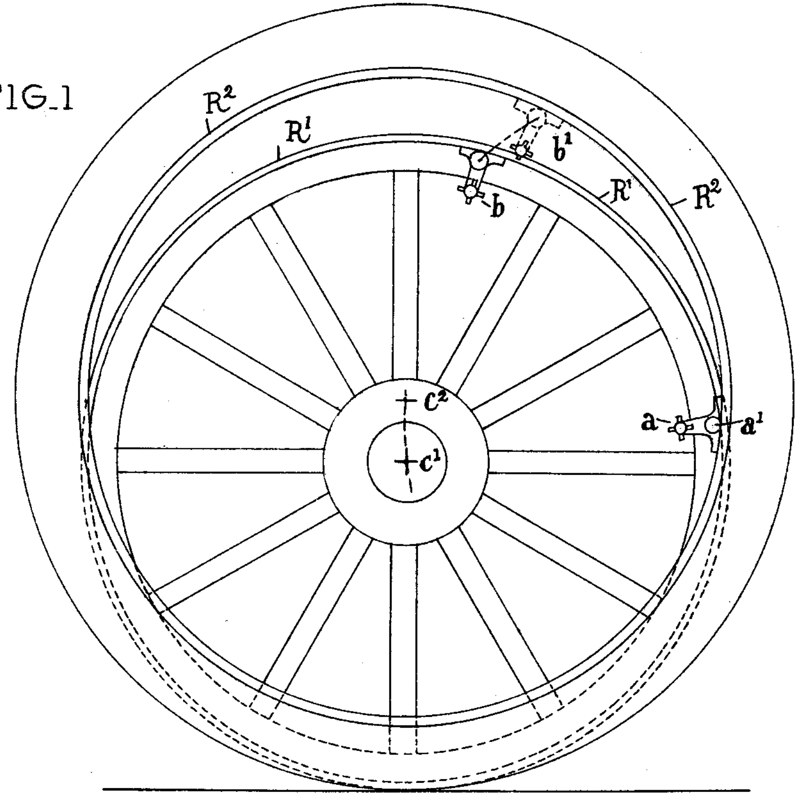
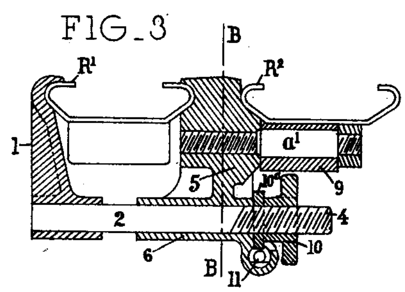
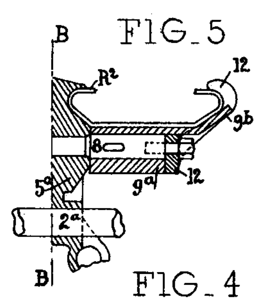
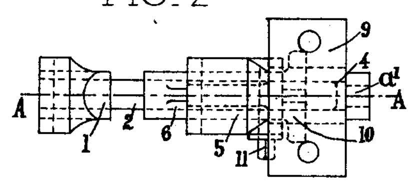
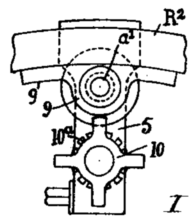
Witnesses
A Van Lorck
[signature]
Inventor
Alexandre J. A. Bruet
By H. B. Willson & Co
Attorneys
COLUMBIA PLANOGRAPH CO., WASHINGTON, D. C.

UNITED STATES PATENT OFFICE.

ALEXANDRE JOSEPH ADOLPHE BRUET, OF ST. DENIS, FRANCE.

AUXILIARY RAISING AND CENTERING VEHICLE-RIM.

1,078,825. Specification of Letters Patent. Patented Nov. 18, 1913.

Application filed December 9, 1912. Serial No. 735,797.

*To all whom it may concern:*

Be it known that I, ALEXANDRE JOSEPH ADOLPHE BRUET, a citizen of the French Republic, residing at 26 Rue de la Legion d'Honneur, St. Denis, Seine, France, have invented certain new and useful Improvements in Auxiliary Raising and Centering Vehicle-Rims, of which the following is a specification.

This invention relates to a device for enabling a damaged or deflated wheel to be raised and centered automatically.

The object of the invention is to provide a device of this character which will center and raise a damaged wheel without the employment of a jack or any other auxiliary raising device.

The invention consists in providing an auxiliary rim with a pivoted clamping device which enables this rim to be connected with the damaged wheel, this connection being effected at the point where the two rims meet or are disposed opposite each other and in providing the wheel rim with a supporting device, so that when the vehicle is moved forward or backward, the auxiliary rim which is provided with an inflated tire raises and centers the damaged wheel within the auxiliary rim when the vertical line of the point of support on the ground passes between the pivoted clamping device and the supporting device, this latter coming against the inner face of the auxiliary rim. The two devices, the pivoted clamping device and the supporting device, then serve for rigidly connecting the two rims.

In the annexed drawing given by way of example, Figure 1 illustrates a damaged wheel and an auxiliary rim ready to raise and center it; Fig. 2 is a plan of the pivoted clamping device, fixed to the auxiliary rim; Fig. 3 is a section thereof through A—A; Fig. 4 is an end view; Fig. 5 is a partial section of the connecting device that is fixed to the damaged wheel.

In Fig. 1, R′ is the rim of the damaged wheel, the center of which is at $c'$, the tire having been removed. $R^2$ is the auxiliary rim, provided with an inflated tire, and having its center at $c^2$. The two rims R′ and $R^2$ have practically the same diameter and the auxiliary rim $R^2$ carries a clamping device *a* pivotally connected at $a'$ and enabling the two rims to be connected by means of a tightening cheek. The auxiliary rim $R^2$ is placed against the wheel rim R′ so that their centers $c'$ and $c^2$ are one above the other and the connecting device *a* is at the point where the two rims overlap as indicated in Fig. 1. At a suitable point in the damaged rim R′ a supporting device *b* is fixed.

When the rims $R^2$ and R′ are connected by means of the device *a* the cheek of which is tightened up against the rim R′ it is only necessary to move the vehicle forward or backward to bring the vertical line of the point of support on the ground between the connecting member *a* and the supporting member *b*. This movement will raise the rim R′ to bring its center in the geometrical axis of the center of the rim $R^2$. At the same time the supporting member *b*, which is fixed to the rim R′ comes against the inner face of the rim $R^2$, taking the position $b'$ indicated in dotted lines, the points of this member *b* having described a circle around the axis of rotation $a'$ of the member *a* that is fixed to the rim $R^2$. The rim R′ is thus held centered on the rim $R^2$ and in order to effect a rigid connection it is only necessary to connect the member *b* with the rim $R^2$ and, according to the weight of the vehicle, to add one or more supplementary connecting members, suitably distributed over the circumference of the rims.

Figs. 2 and 4 illustrate one of the forms of construction of the pivoted clamping member *a*. This member is fixed to the rim $R^2$ by means of a bearing 9 riveted on to the rim (Fig. 4). This bearing carries the rotating pin $a'$ on which is mounted a block 5 which has a conical part 7 the inclination of which corresponds to that of the rim $R^2$ and permits the rotation of $R^2$ around the pivot $a'$. Integral with the block 5 is a sleeve 6 into which a rod 2 runs the screw-threaded end 4 of which is provided with a winged nut 10. On the other end of the rod 2 the cheek 1 is fixed that can be tightened up against the rim R′ of the damaged wheel. The nut 10 has teeth $10^a$ (Fig. 4) which can be engaged by a safety bolt 11 (Fig. 3) intended to prevent untightening.

The connecting member *b* which is secured on the rim that is to be relieved is in part similar to the connecting member *a*. Fig. 5 shows the part that differs. The part not shown to the left of the line B B is similar to the corresponding part of the member *a* (Fig. 3). In the case of the member *b* (Fig. 5) the bearing $9^a$ is fixed on the rod 8 without being able to rotate thereon.

This bearing may terminate in a dished part $9^b$. A hooked yoke or stirrup 12 may be fixed by a nut for the purpose of connecting the clamp *b* to the rim $R^2$. It is of course understood that this construction of the connecting members is only given by way of example.

I claim as my invention:

1. A device for automatically raising and centering a vehicle wheel, comprising an auxiliary rim, a clamping member mounted on said auxiliary rim having means for engaging the rim of the wheel to be raised at the point where said wheel and auxiliary rims overlap, a supporting member carried by the rim of the wheel to be raised and having means for engaging the auxiliary rim for locking the rims together after the wheel has been centered.

2. A device for raising and centering a vehicle wheel, comprising an auxiliary rim provided with a pivoted member having means for engaging the wheel to be raised at the point where the wheel and auxiliary rims overlap.

3. A device for automatically raising and centering a vehicle wheel, comprising an auxiliary rim provided with an inflated tire, a member carried by said auxiliary rim and provided with a cheek for engaging the rim of the wheel to be raised.

4. A device for automatically raising and centering a vehicle rim, comprising an auxiliary rim provided with an inflated tire, a member carried by said auxiliary rim and provided with a cheek for engaging the rim of the wheel to be raised, and means carried by the rim of the wheel to be raised for locking said rim to said auxiliary rim.

5. A device for automatically raising and centering a vehicle wheel, comprising an auxiliary rim provided with a pivoted clamping member having a bearing therein, a rod mounted to slide in said bearing and provided on one end with a cheek for engaging the rim of the wheel to be raised, the other end of said rod being threaded, and a tightening nut engaged with the threaded end of said rod for drawing said cheek into engagement with said wheel rim.

In testimony whereof I have affixed my signature, in presence of two witnesses.

ALEXANDRE JOSEPH ADOLPHE BRUET.

Witnesses:

HANSON C. COXE,

CHARLES FABER.

Copies of this patent may be obtained for five cents each, by addressing the "Commissioner of Patents, Washington, D. C."